(12) United States Patent
Kirkpatirck et al.

(10) Patent No.: US 7,444,812 B2
(45) Date of Patent: Nov. 4, 2008

(54) SHAPE MEMORY ALLOY MEMS HEAT ENGINE

(76) Inventors: Scott Ryan Kirkpatirck, 2351 Brooklynn Dr., Terre Haute, IN (US) 47802; Azad Siahmakoun, 129 Lakeshore Dr., Terre Haute, IN (US) 47803; Thomas McDaniel Adams, 60 S. 24th St.., Terre Haute, IN (US) 47803; Zhefu Wang, 755 NW. 3rd St., Corvallis, IN (US) 97330

( * ) Notice: Subject to any disclaimer, the term of this patent is extended or adjusted under 35 U.S.C. 154(b) by 279 days.

(21) Appl. No.: 10/905,937

(22) Filed: Jan. 27, 2005

(65) Prior Publication Data

US 2006/0162331 A1 Jul. 27, 2006

(51) Int. Cl.
*F01B 29/10* (2006.01)
(52) U.S. Cl. .......................................... 60/528; 60/529
(58) Field of Classification Search ............ 60/527–528
See application file for complete search history.

(56) References Cited

U.S. PATENT DOCUMENTS

| | | | | |
|---|---|---|---|---|
| 2,671,177 | A * | 3/1954 | Robinson et al. ............. 310/309 |
| 3,013,201 | A * | 12/1961 | Goldie ......................... 322/2 A |
| 3,307,783 | A * | 3/1967 | Wiebelt ......................... 236/1 R |
| 4,055,955 | A | 11/1977 | Johnson ......................... 60/527 |
| 4,302,939 | A | 12/1981 | Golestanah ..................... 60/527 |
| 4,490,976 | A | 1/1985 | Johnson ......................... 60/527 |
| 4,691,517 | A | 9/1987 | Banks ........................... 60/527 |
| 4,691,518 | A | 9/1987 | Banks ........................... 60/527 |
| 5,619,177 | A * | 4/1997 | Johnson et al. ............. 337/140 |
| 6,070,656 | A * | 6/2000 | Dickey .................... 165/104.26 |
| 6,201,980 | B1 * | 3/2001 | Darrow et al. ............... 600/347 |
| 6,226,992 | B1 | 5/2001 | Kutlucinar et al. ............ 60/528 |
| 6,232,790 | B1 * | 5/2001 | Bryan et al. .................. 324/754 |
| 6,236,300 | B1 * | 5/2001 | Minners ....................... 337/139 |
| 6,358,380 | B1 | 3/2002 | Mann et al. ............... 204/192.2 |
| 6,574,958 | B1 | 6/2003 | MacGregor .................. 60/527 |
| 6,588,208 | B1 | 7/2003 | Clements ...................... 60/527 |
| 6,664,885 | B2 * | 12/2003 | Bromley et al. ............. 337/104 |
| 6,689,486 | B2 | 2/2004 | Ho et al. ...................... 428/610 |
| 6,895,645 | B2 * | 5/2005 | Xu et al. ..................... 29/25.35 |
| 2005/0238506 | A1 * | 10/2005 | Mescher et al. .......... 417/413.1 |
| 2006/0038643 | A1 * | 2/2006 | Xu et al. ........................ 335/78 |

OTHER PUBLICATIONS

A Dictionary of Physics, 2005, pp. 222-225, fifth edition, Oxford University Press, New York.
Benenson, Harris, Stocker, Lutz, Handbook of Physics, 2006, p. 703, Springer Science, New York.
The New Encyclopaedia Britannica, 2007, 15th edition, vol. 28, Macropedia "Knowledge in Depth", pp. 621-625, Encyclopedia Britannica, Inc., Chicago.
Hatsopoulos, Keenan, Principles of General Thermodynamics, 1985, p. 121, Wiley, New York.

* cited by examiner

*Primary Examiner*—Hoang M Nguyen

(57) ABSTRACT

A microelectromechanical systems (MEMS) based heat engine capable of converting thermal energy gradients into mechanical or electrical energy, as well as its fabrication process is disclosed. This heat engine design consists of a stressed oscillating beam formed from a shape memory alloy (SMA) thin film. As the temperature of the beam changes, its shape changes due to the phase transformation of the shape memory alloy, causing it to oscillate between a hot source and a cold source. Due to the hysteretic behavior of the phase transformation, the oscillating SMA cantilever beam produces a net mechanical work output that may be either converted to electrical energy or mechanically linked to other MEMS devices.

16 Claims, 10 Drawing Sheets

SHAPE MEMORY ALLOY MEMS HEAT ENGINE

BACKGROUND OF THE INVENTION

The first known observation of the shape memory transformation was by Chang and Read in 1932. They noted the reversibility of the α solid phase transformation in a gold cadmium (AuCd) alloy from metallographic observations and resistivity change measurements. In 1951 the shape memory effect (SME) itself was observed in a bent bar of AuCd. Then in 1962 Buehler et al. discovered the SME effect in nickel-titanium (NiTi). The group named the alloy "Nitinol", after its elemental components and place of origin. The "Ni" and "Ti" are the atomic symbols for nickel and titanium, respectively, the "NOL" stands for the Naval Ordinance Laboratory.

The first use of an SMA in a heat engine application, in which thermal energy is changed into mechanical work, was accomplished in 1973 by Ridgway Banks and Hap Hagopian of the Lawrence Berkely Laboratory at the University of California. SMA heat engines became very popular as fascinating visual demonstrations of the shape memory effect and of heat engines in general. However, practical engineering applications were not successful, as the theoretical upper limit of efficiency (Carnot efficiency) approached only 4-5%. Furthermore, most heat engine designs were extremely complex.

Microelectromechanical systems (MEMS) researchers are always looking for new designs, methods and materials, especially as the demand for silicon micromachined devices continues to soar in a variety of fields including medicine, biotechnology, the semiconductor industry and a host of other applications. With the development of thin film fabrication techniques in the last decade, SMA thin films have attracted great interest as a potentially powerful actuation material for MEMS. This is mainly due to the fact that SMA thin films are capable of large forces and displacements compared to other actuator types such as electrostatic, electromagnetic, and piezoelectric actuators.

The possibility of integrating NiTi SMA thin films into a silicon micromachining process was first demonstrated in 1990, with the first SMA actuated microvalve reported in 1992. Since then, researchers have worked extensively to clarify the properties of SMA thin films, while simultaneously attempting to fabricate other micro devices driven by SMA thin films. Although a number of other NiTi actuated microdevices, including microvalves, micropumps, microrelays, micromirrors and out-of-plane spacers, have been reported recently, the TiNi Alloy Co. microvalve is currently the only known commercially available device.

Recently researchers have been developing MEMS based internal combustion engines and turbines as possible replacements for batteries. The major benefit comes in the form of the high energy density associated with fuels when compared to electrochemical cells. However, shape memory alloy based MEMS heat engines have not been mentioned or even conceived of prior to the current invention by the inventors. The prior art does mention the use of NiTinol materials in heat engine designs nor in MEMS applications; no one has even hinted at combining these two applications of shape memory alloys. This is likely due to the extremely complicated designs required by prior SMA heat engines used as visual demonstrations.

In addition to the energy density advantage MEMS heat engines offer over other energy sources, MEMS heat engines offer the possibly of exploiting favorable scalings of several physical quantities. Scaling normal sized devices down to the microscale can shift the influence of certain physical parameters on the total system dramatically. For example, the ratio of surface area to volume is significantly larger at the microscale, making surface tension, an effect routinely ignored at the macroscale, a dominant feature of microfluidic devices. Such favorable scalings provide for fast heat transfer rates and large temperature gradients for an SMA-MEMS heat engine, features which are absent in macro-sized SMA heat engines and therefore significantly hinder their performance and efficiency. Furthermore, SMA thin films produced in batch fabrication thin film processes may have different material properties compared to bulk materials, most notably extrinsic stresses induced by high temperature processing and deposition. Harnessing this stress offers the possibility of greatly simplifying the fabrication process of an SMA-MEMS heat engine.

In summary, the prior art MEMS engines suffer from large losses through friction and other losses to the point where they nearly have difficulty producing more energy than they require to operate. SMA-macro engines lack sufficient thermal gradients, speed, efficiency and adequate harnessing mechanisms for operation.

SUMMARY OF THE INVENTION

The present invention is a shape memory alloy based MEMS heat engine created using modern microfabrication techniques. The heat engine contains an SMA thin film cantilever beam oscillating between a hot and cold source. (See FIG. 1). Thin films vary in thickness from a few angstroms to greater than 20 microns. In its initial cold state the film is in the martensite solid phase, and is bent due to the extrinsic stress developed during the fabrication process. (See FIG. 2). In the first preferred embodiment a thin cantilever beam made of a bi-layer of silicon dioxide (1-6 μm thick) and a shape memory alloy thin film layer (0.5-4 μm thick) oscillates between a hot source and a cold source. (See FIG. 3). (The stress is generated due to the difference in thermal expansion between the silicon dioxide and the shape memory alloy as the film cools down from the high deposition temperature.) The cold beam is placed into contact with a hot source, which causes a solid phase transformation from martensite to austenite thereby straightening the beam. The beam therefore pulls away from the hot source and cools down, undergoing the reverse phase transformation back to martensite. The beam then again makes contact with the heat source and the process continues. A similar process for heating and cooling for another embodiment of the current invention is shown in FIG. 4. The oscillation is maintained due to the difference in temperature between the martensite and austenite phase transformations. Alternative embodiments include different cantilever designs as well as different methods for harnessing the thermal energy and converting to other forms.

The SMA-MEMS heat engine provides solutions to problems associated with other micro-engines that utilize different modus operandi, as well as problems encountered in macro-sized SMA engines, and thereby provides unexpected beneficial and synergistic results. The present invention solves these problems by taking advantage of design concepts suited for microapplications. Specifically, smaller objects cool faster, increasing the possible operation frequency of an SMA-MEMS heat engine over macro-sized engines. Furthermore, the microscale electrostatic forces and electromagnetic forces also become much more significant thus providing excellent mechanisms for power conversion. The oscillating beam design described here has no rubbing parts thus reducing friction forces compared to typical engine designs. The design also takes advantage of the mass production capabilities of silicon batch processing. This allows easy scaling of the designed device by simply increasing the number of heat engines attached to any temperature gradient or hot and cold sources.

OBJECT OF THE INVENTION

It is therefore an object of this invention to provide a shape-memory alloy heat engine having at least one dimension less than 100 micrometers. It is also an object of this invention to provide a cantilever based heat engine. It is also an object of this invention to create a shape memory alloy heat engine from a shape memory alloy thin film.

It is another object of the invention to create a released structure having a predictable initial internal stress. It is another object of the invention to create self curved cantilever beams. It is another object of this invention to create a self assembled MEMS device where devices are vertically lifted during release. It is another object of this invention to develop mechanical movement from a heat source and a cold source using thin film deposition techniques. It is another object of the invention to develop electrical power from the mechanical movement the shape memory alloy heat engine develops. It is also an object of this invention to create a MEMS based shape-memory alloy heat engine. It is a further object of this invention to create a heat engine using thin films and thin film deposition techniques.

DESCRIPTION OF THE PREFERRED EMBODIMENTS

Figure 1:
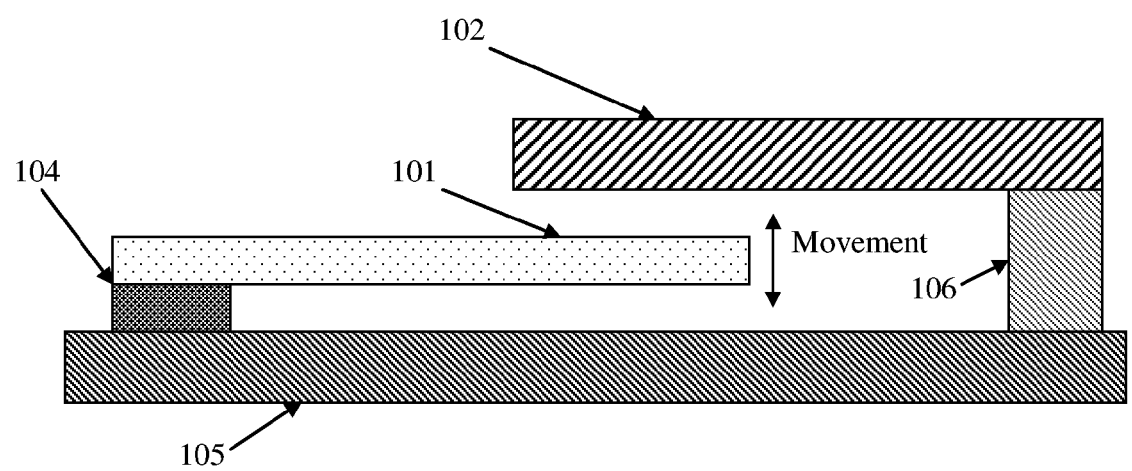
FIG. 1 shows a schematic for one design of a general preferred embodiment.

As shown in FIG. 1, the basic current invention consists of the following, a hot source 102 in proximity to an oscillating device 101 containing shape memory alloy and a cold source 105. In FIG. 1 the cold source is also the substrate. Additionally, isolation regions 104 and 106 may be added to adjust heat flow into the cold source by varying their thicknesses. Isolation region 106 is not required so long as the hot source can maintain a separation from the oscillating beam.

Figure 2:
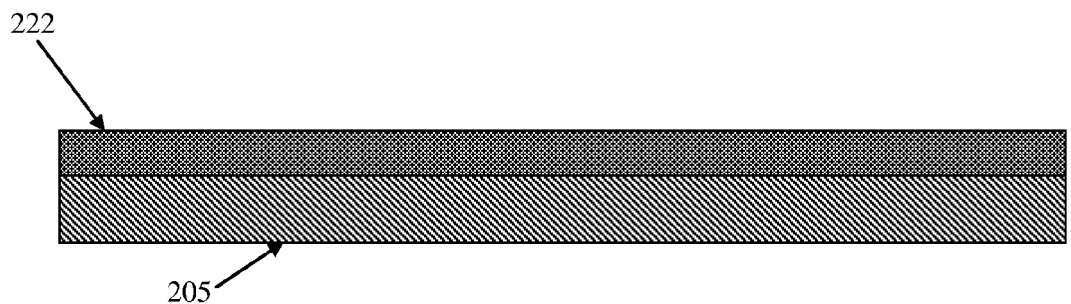
FIG. 2a-e. shows fabrication procedure of the heat engine without spring load.
Figure 2:
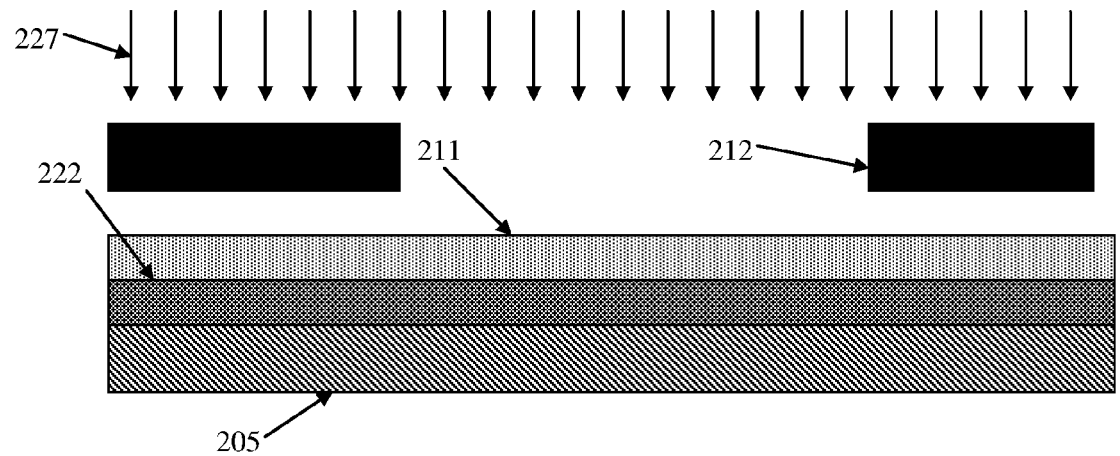
Figure 2:
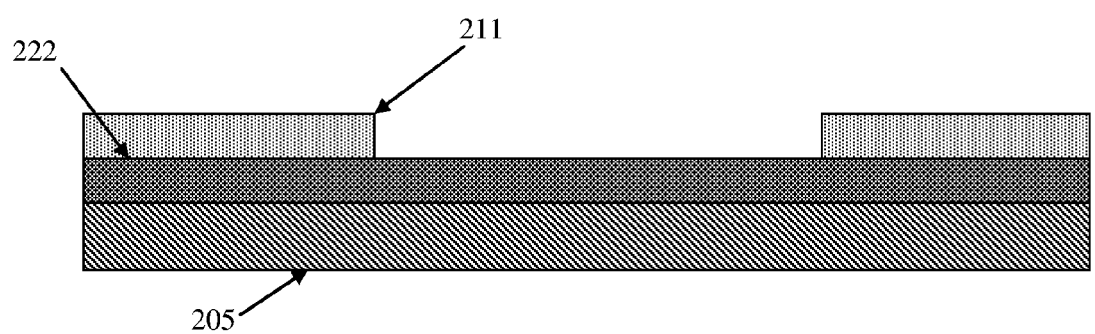
Figure 2:
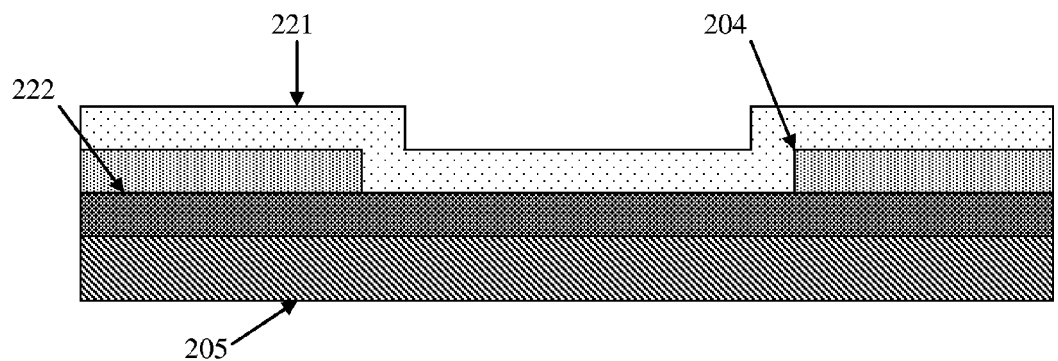
Figure 2:
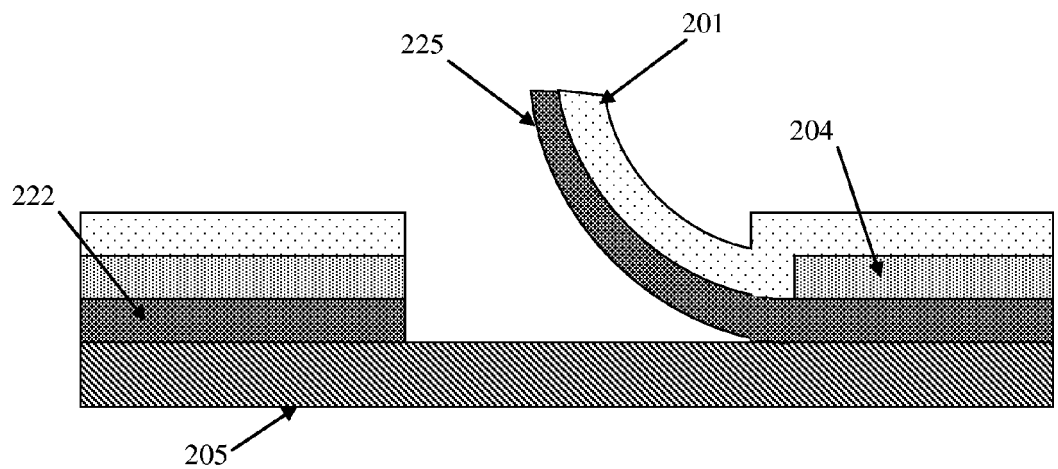
Figure 3:
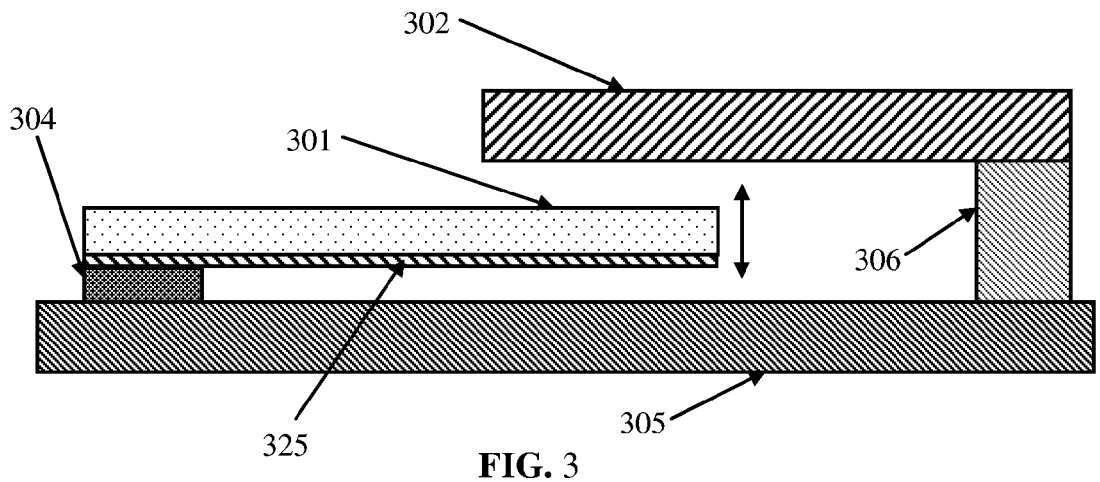
FIG. 3 shows a possible design encompassing the first and fifth preferred embodiments.
Figure 5:
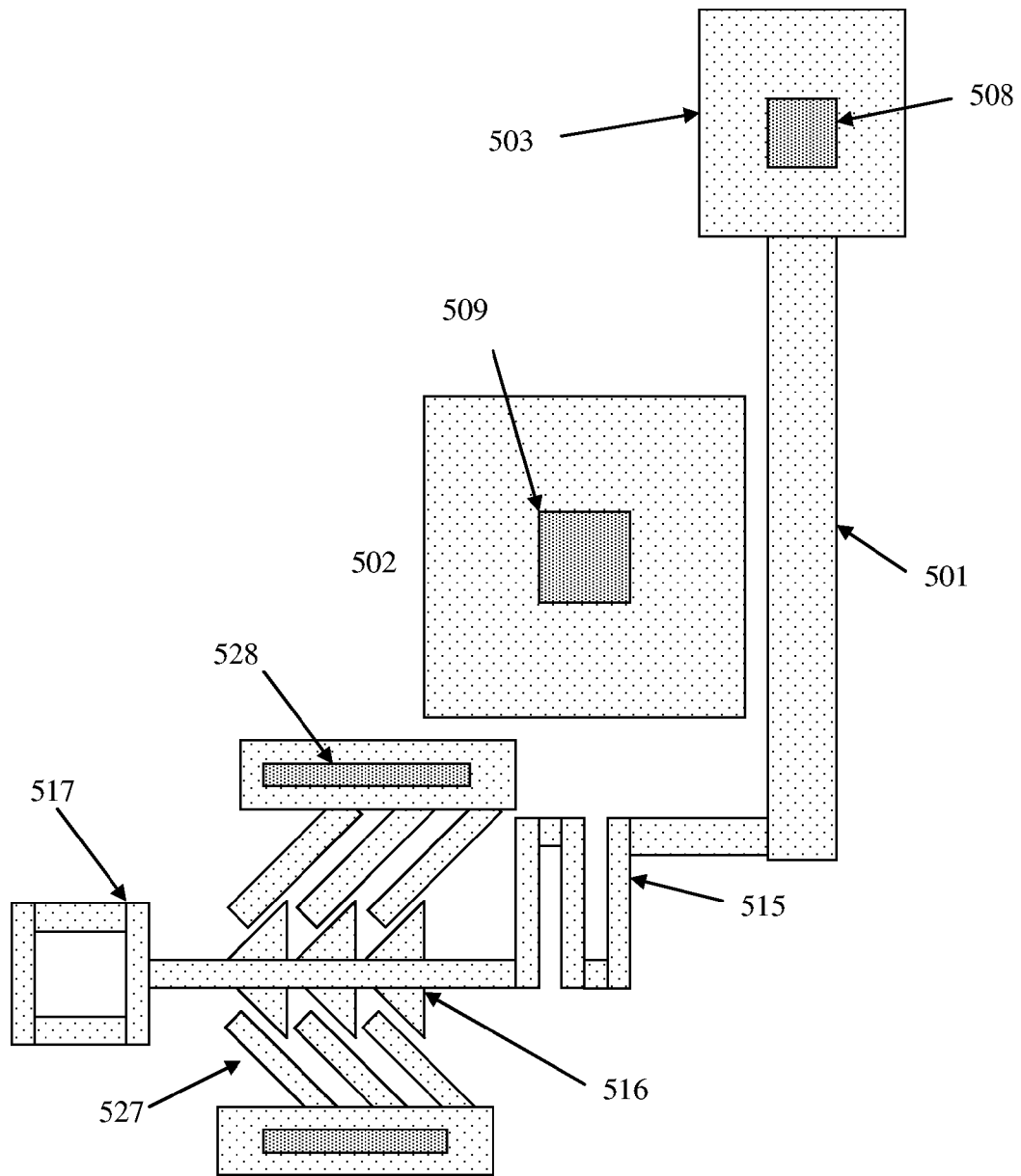
FIG. 5 shows a possible layout design for the second design of a preferred embodiment.
Figure 6:
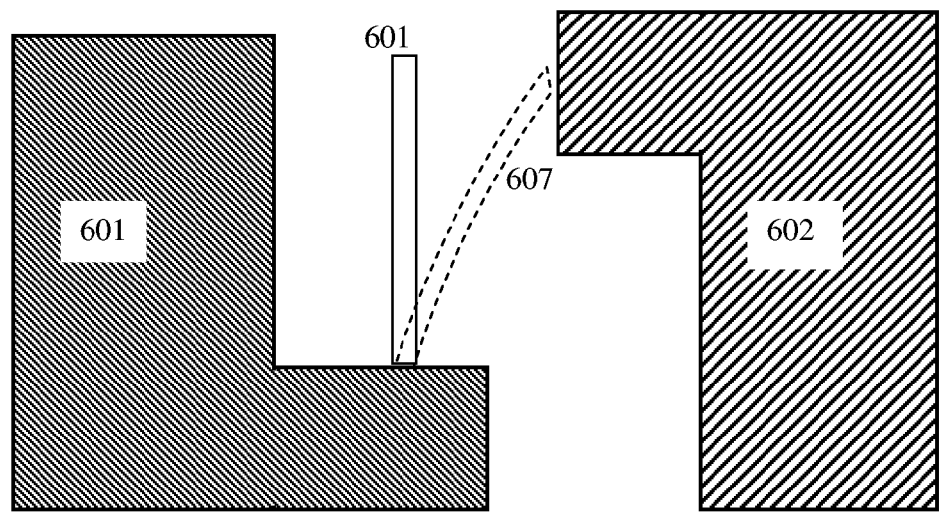
FIG. 6 shows a schematic for a second design of a preferred embodiment.

Several general preferred embodiments of the current invention will be described. The first preferred embodiment is a dual layer thin film cantilever (FIG. 3) with a pair of temperature reservoirs and its manufacturing process (FIG. 2). The second preferred embodiment is a dual layer thin film structure for vertical movement and lifting of structures. The third embodiment is a single layer thin film heat engine with an applied load (See FIG. 4 and FIG. 5). The fourth is a heat engine with developing power from a "trained" SMA device (FIG. 6). The fifth embodiment regards using the heat engine for producing electric energy using an electrostatic generator (FIG. 3). The sixth embodiment is using magnetic induction for an electric generator (See FIG. 7 and FIG. 8).

The operational mechanism of the heat engine design is based on changes in curvature of the cantilever brought about by the solid phase transformation of TiNi in going from martensite to austenite and the reverse transformation. Specifically, changes in the mechanical properties of TiNi most notably Young's modulus, yield strength and volume change, cause variations in the curvature of the cantilever during heating and/or cooling.

FIG. 3 shows the proposed TiNi shape memory alloy heat engine in its first preferred embodiment. The engine consists of a single thin film cantilever (301 and 325) that oscillates in a plane perpendicular to the silicon substrate to which it is anchored. The substrate 305 also serves as the low temperature reservoir. 302 is the hot source and may be attached to the system through an isolation layer 306. The isoloation layer may be a deposited thin film or other material such as epoxy. Hot source 302 may be another beam, or cover over the oscillating SMA device. For example, 302 may be a packaging lid over the device or chip on which the heat engine is placed. The oscillating beam itself consists of a bi-layer of silicon dioxide 325 and a TiNi SMA 301 that is curved away from the substrate in its room temperature martensite phase, due to tensile stress developed in the TiNi during the fabrication process. In its high temperature, high modulus austenite phase, however, the beam is fairly rigid with a significantly smaller curvature. This change in curvature caused by temperature induced solid phase transformation provides the operational mechanism for the heat engine.

The operation of the heat engine proceeds as follows. While in its cold-temperature low modulus martensite phase, the curvature of the cantilever pulls it onto the heat source. In this martensite phase, the beam is heated through contact with the heat source, increasing the temperature and eventually leading the TiNi to undergo the austenite phase transformation. Once the transformation has occurred, the beam's low curvature austenite shape is recovered, overcoming the tensile stress within the TiNi film and pulling it away from the heat source. With the heat source no longer in contact with the beam, it starts to cool, eventually reaching the martensite start temperature and transforming back into the martensite phase. Once in the low modulus martensite phase, the tensile stress within the TiNi film again brings the beam into contact with the heat source and the cycle starts over. Cycled in this way, the heat engine can be driven by fairly low temperature differences (less than 30° C.), harnessing power for MEMS applications.

Standard MEMS fabrication procedures known to one of ordinary skill in the art may be employed for creating the TiNi thin film heat engines. Specifics of the steps in the fabrication procedures are given below, which is the second embodiment as a vertical lifting mechanism.

Prior to deposition of the TiNi layer, an oxide layer 222 is deposited using e-beam evaporation on a silicon wafer 205 or other suitable substrate, followed by photoresist 211. The photoresist is then exposed to radiation 227 typically ultraviolet light and developed. The photoresist pattern 212 consists of windows ranging from several microns to 1 mm in width and tens of microns to 1 mm in length.

The TiNi or other suitable shape memory alloy thin film is then deposited 221 on the silicon dioxide layer at an elevated temperature. The TiNi thin film can be deposited using either a sputtering procedure, or with a co-evaporation procedure in which titanium and nickel are deposited using e-beam and/or thermal evaporation techniques. Upon cooling to room temperature after deposition, the difference in thermal expansion coefficients between the TiNi and the silicon dioxide results in a residual stress within the TiNi layer, causing the TiNi (201)-SiO2(225) bi-layer to peel away from the substrate. The resulting structure is a vertically bent cantilever beam with a direction of motion perpendicular to the substrate. This vertically bent beam may also be utilized to lift other structures into position, such as micromirrors. The thermal stress generated within the bi-layer during the cooling process is utilized as the load needed for bringing the beam in contact with the hot source while the TiNi is in the martensite phase. The remaining photoresist acts as an isolation region 204. This isolation region 204 behaves as both thermal and mechanical isolation, preventing the peeling of the TiNi thin film over the entire wafer. This method of releasing may also be used for self assembling and self raising of other MEMS structures such as micromirror or microswitches. Finally, to reproduce the device as shown in FIG. 3, a heat source 302 is brought into proximity or touching the oscillating beam 301, 325. The beam may be attached to the substrate 305 using an isolation layer 306. An additional isolation layer 304 may be placed between the oscillating beam and the cold source (substrate 305) to produce the appropriate heat flow and temperature region at the oscillating beam.

Subsequent to deposition, annealing of the devices may be performed to nucleate an appropriate microstructure. Annealing time and temperature may be varied to determine the optimal process characteristics for a heat engine as would be known by one of ordinary skill in the art.

Figure 4:
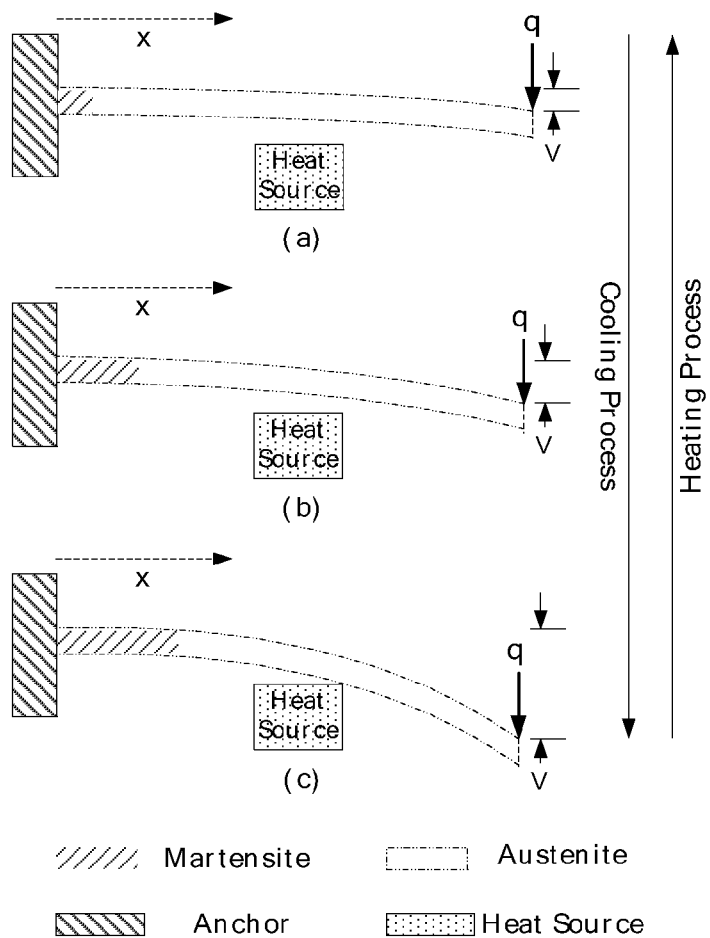
FIG. 4 shows a schematic diagram of operation for the preferred embodiment.

In a third embodiment an applied load from a spring is set to allow the engine to operate. This design is shown in FIG. 4 and FIG. 5. In FIG. 4 the load "q" applied to the cantilever tip allows the displacement "v" of the beam when supplied with a hot and cold source (in this case the anchor). As shown in FIG. 5, this second design harnesses the stress strain relationship of the shape memory alloy by the attached spring 515 at the end of the cantilever beam 501, and a "zip-strip" type mechanism 516 and 527 for mechanically applying a force to the cantilever beam. The "zip strip" mechanism allows a stress to be applied to the cantilever beam 501 after processing. A secondary MEMS device or probe moves the ring 517 which moves the serrations 516. The serrations 516 move past a set of herring bone beams 527 allowing motion in only one direction. This results in a stress being applied to the beam 501. Spring 515 may be added to add greater flexibility in the force applied to the beam 501. The herring bone beams are anchored in place to the substrate through anchor holes 528 in the sacrificial layer. In this second design, the cantilever typically consists only of a single material, TiNi SMA; the cantilever beam's motion is in a direction parallel to the substrate to which it is anchored. An insulating layer may be placed between the SMA layer and the substrate for adjusting the heat flow to the cold source. The beam 501 is initially in the weaker martensitic phase and transforms to the stronger austenite phase upon heating. Once heat is applied or produced at the hot source 502, the cantilever beam 501 begins to transform, and begins to pull away from the hot source 502. The cantilever beam 501 then bends toward the cold source 503 or simply away from the hot source if the cold source is the substrate or constantly in contact with the beam. Once in contact with the cold source or significantly away from the heat source; the heat is dissipated and then the beam transforms back to martensite, and the beam cycles back toward the hot source 502. Anchors for the hot and cold sources (509 and 508 respectively) may be adjusted in size for optimization of heat flow while maintaining adhesion to the substrate.

Figure 9:
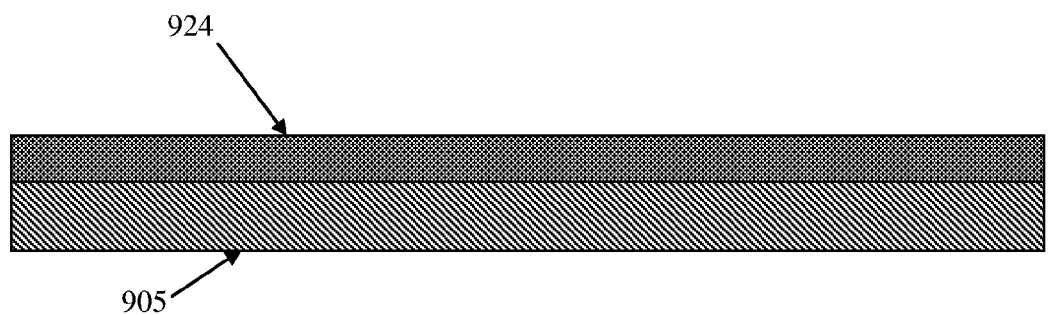
FIG. 9a-g shows the fabrication procedure of the heat engine with spring load.
Figure 9:
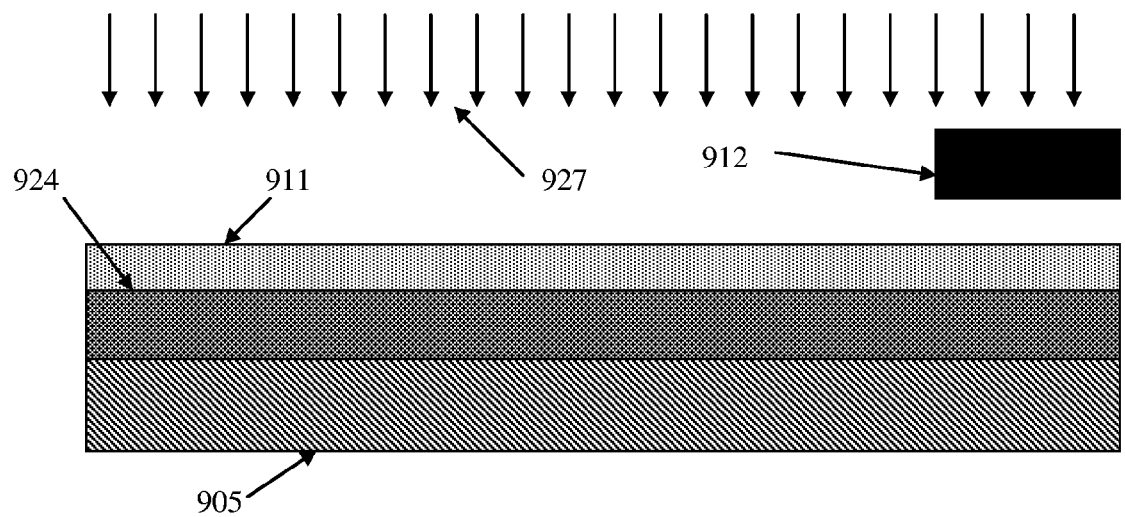
Figure 9:
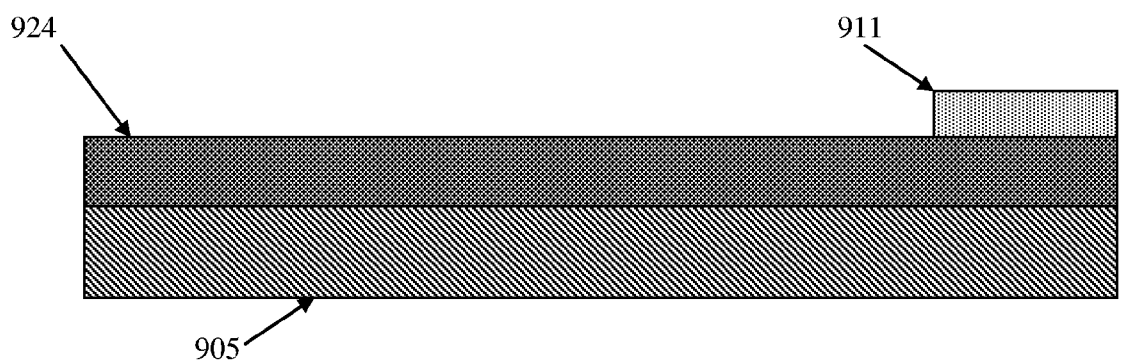
Figure 9:
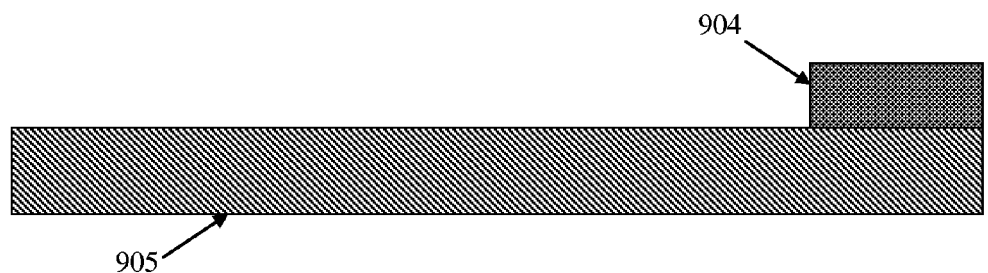
Figure 9:
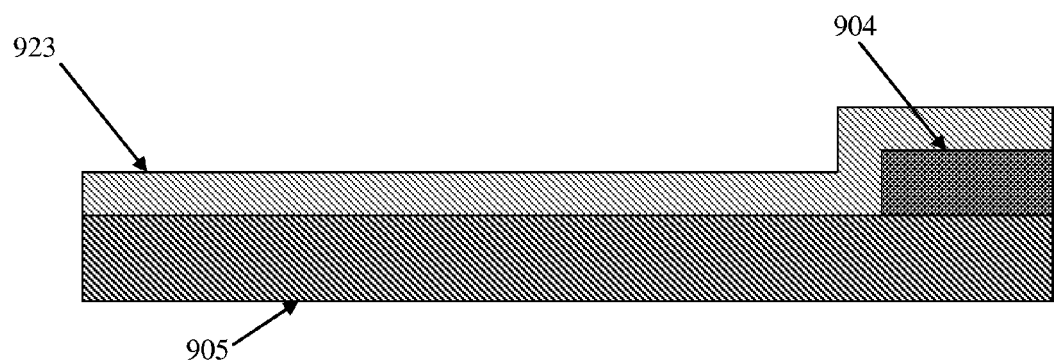
Figure 9:
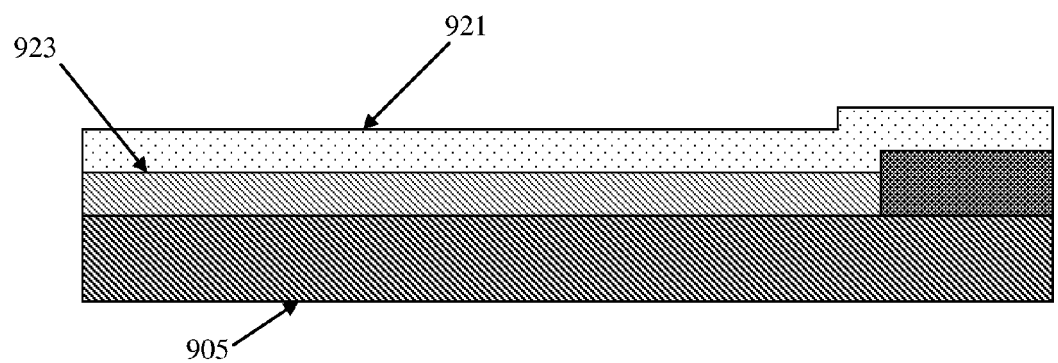
Figure 9:
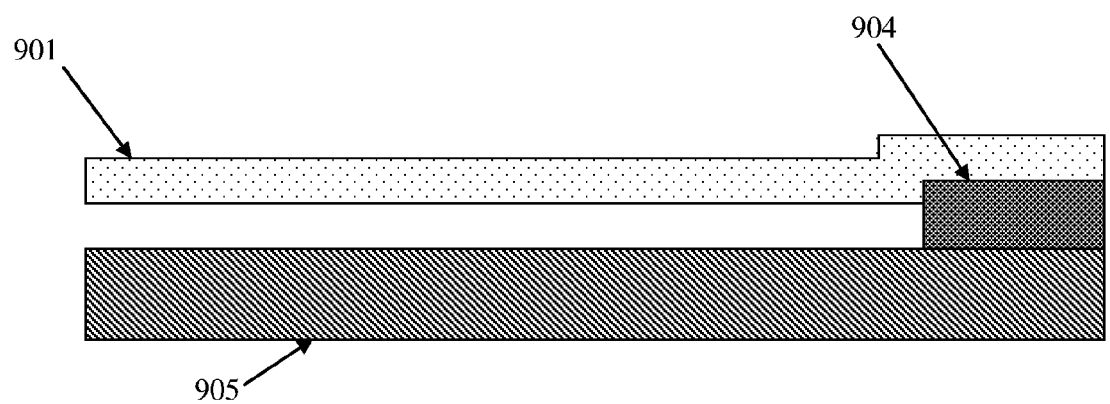

FIG. 9 shows the fabrication procedure for the heat engine design with an applied spring load. A silicon nitride layer 924 or other suitable insulator is grown or deposited on a silicon substrate 905 as an isolation layer. Using photoresist 911 and mask 912 the isolation layer is exposed using ultraviolet light 927 and etched forming isolation regions 904. After lithographic patterning, a sacrificial layer 923 which may be silicon dioxide is deposited using e-beam evaporation or other appropriate methods. This is followed by another patterning and etching of the sacrificial layer 923. Then the TiNi thin film 921 is deposited using evaporation, e-beam evaporation, arc-evaporation or sputtering. After the TiNi thin film deposition, etching is used to produce a cantilever structure from the TiNi thin film. The "zip strip" (516, 527) hot 502 and cold 503 sources may be made of the same TiNi material or may be a different structural material such as polysilicon. The last step is to etch away the sacrificial layer 923 releasing the cantilever. Device fabrication may be performed on silicon wafers 905 or other suitable substrates. The silicon dioxide may be the sacrificial layer, and evaporated TiNi may be the structural layer.

FIG. 6 depicts the two positions for a SMA heat engine as described as the fourth embodiment. In the fourth embodiment a cantilevered beam 601 is placed on a micromanipulator station and bent to position 607. The beam is then heated while in position 607. The beam will then be cooled, and bent again. The beam will continue to be cycled until the beam deforms upon cooling as well as heating remembering its shape. Once the shape memory alloy has been cycled significantly the beam will remember its shape for each phase. Region 601 is the cold source which may be the substrate, and region 602 is the hot source.

The fifth preferred embodiment as shown in FIG. 3 is useful for harnessing the oscillating motion through electrostatic generation. A SMA layer 301 having an insulating layer 325 underneath is connected to a set of circuitry to harness energy stored in a variable capacitor. The insulating layer on the lower portion of the cantilever beam prevents shorting of the device.

Figure 7:
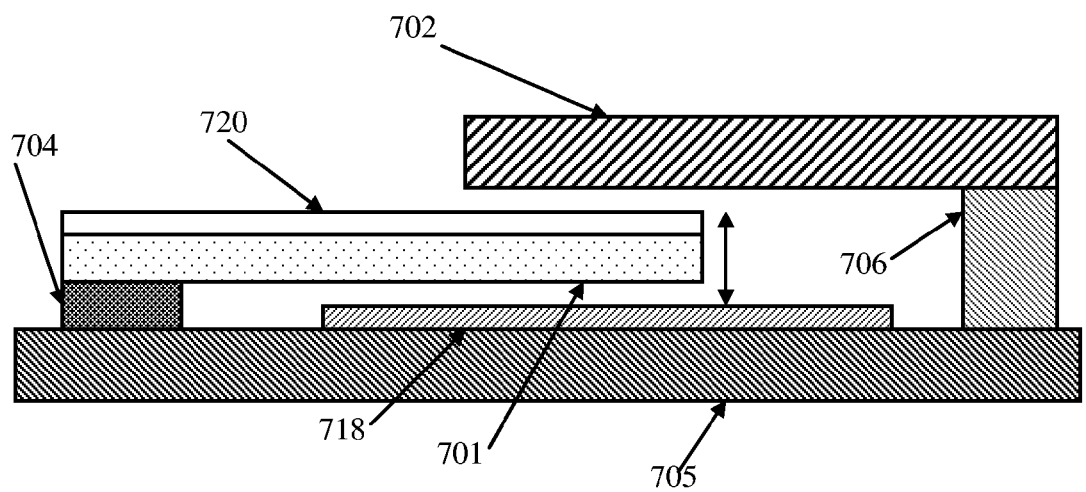
FIG. 7 shows a possible layout design of the sixth preferred embodiment.
Figure 8:
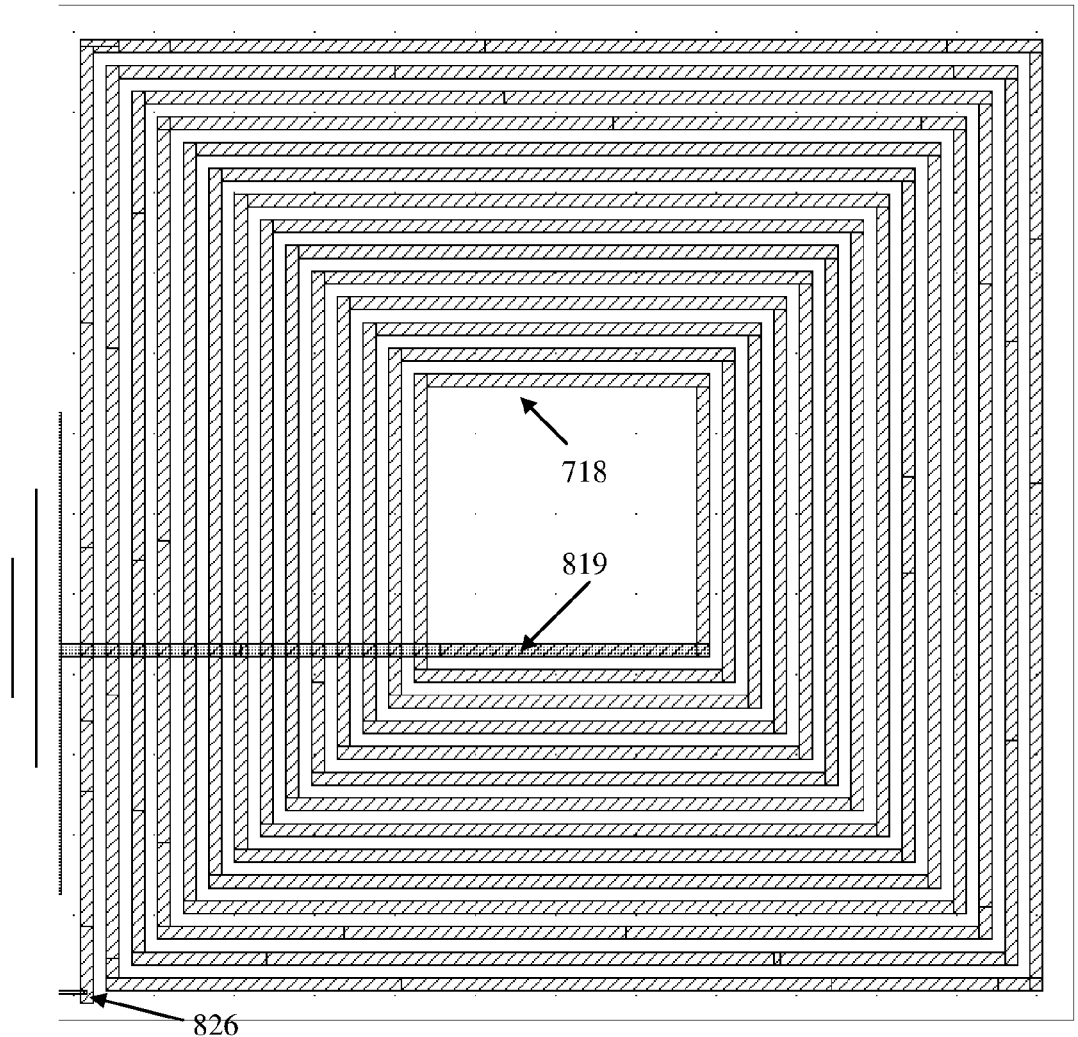
FIG. 8 shows a flat coil.

The final preferred embodiment is harnessing the oscillating movement of the thin film through magnetic induction (FIG. 7, and FIG. 8). A magnetic layer 720 is placed on the SMA layer 701. As the beam oscillates, the magnetic field near the pickup coil 718 changes from the motion of the permeable magnetic layer 720. This change in field induces a voltage which may be harnessed to power other devices. The beam may oscillate by either internally induced stresses between the SMA 701 and the magnetic layer 720, a third layer such as a silicon dioxide under layer as in a previous preferred embodiment, or by moving parallel to the substrate in another previously described embodiment. Proximity of the hot source 702 may be adjusted by the height of isolation layer 706. The conduction of the beam to the substrate may be adjusted through isolation region 704. FIG. 8 shows a possible flat coil design for picking up the changing magnetic field. Pickup coil 718 connects to a ground wire 719 and an output for the current 726.

The present invention having been described in its preferred embodiments may take on numerous other similar designs as would be obvious to one of ordinary skill in the art. For example the alloy used is an alloy of Ni and Ti, but any shape memory alloy will be sufficient. Also the shape of the heat engine is not necessarily a cantilever beam but any shape provided it may oscillate between a hot source and a cold source. The heat engine device may also be used with other MEMS devices. For example the oscillating beam may be the oscillating beam of a MEMS gyroscope. The oscillating film may also be used to pump fluids in a MEMS device. Thus, it is not to be limited to the details within the preferred embodiments except as set forth by the appended claims.

What is claimed is:

1. An oscillating shape memory alloy heat engine comprising;
   an oscillating member
   wherein said member has a dimension less than 100 microns
   wherein a first portion of said member comprises a shape memory alloy
   a heat source
   a cold source
   wherein said heat engine has a temperature gradient between said heat source and said cold source,
   wherein said temperature gradient is the difference between said heat source and said cold source,
   wherein said temperature gradient has a heat flow,
   wherein a portion of said heat flow is converted into mechanical power,
   wherein said mechanical power portion is a fraction of said heat flow,
   wherein said mechanical power fraction is proportional to said difference between said heat source and said cold source,
   wherein said heat engine contains an isolation region,
   wherein said isolation region reduces said heat flow into said cold source
   wherein said oscillating member contains at least one thin film
   wherein said heat source has a distance from said oscillating member,
   wherein said distance from said oscillating member oscillates when said oscillating member oscillates,
   wherein said oscillating member has at least a first and a second position,
   wherein said heat source has a heat source temperature above an austenite transformation temperature for said shape memory alloy,
   wherein said cold source has a cold source temperature below a martensite transformation temperature for said shape memory alloy,
   wherein said heat source temperature is capable of transforming the phase of a portion of the shape memory alloy of the oscillating member when in said first position from martensite to austenite thus changing the oscillating member position from said first position to said second position,
   wherein said cold source temperature is capable of transforming the phase of a portion of the shape memory alloy of the oscillating member when in said second position from austenite to martensite thus changing the oscillating member position from said second position to said first position,
   wherein said cold source transforming the phase occurs when said heat source is at said heat source temperature,
   wherein said oscillating member contains a means for converting mechanical energy into electrical energy.

2. The oscillating heat engine of claim 1 wherein;
   said oscillating member contains a cantilever beam and
   said oscillating member transfers thermal energy between said heat source and said cold source.

3. The oscillating heat engine of claim 1;
   wherein said shape memory alloy is Nitinol.

4. The oscillating heat engine of claim 1;
   wherein said oscillating member has a bi-layer structure,
   wherein said shape memory alloy has a temperature hysteresis between austenite and martensite phases,
   wherein said oscillating member oscillates with a heat source temperature variation of less than the shape memory alloy hysteresis.

5. The oscillating heat engine of claim 1 wherein said oscillating member has an externally applied mechanical load.

6. The oscillating heat engine of claim 4 wherein said bi-layer structure has a first layer and a second layer,
   wherein said first layer has a different thermal expansion coefficient than said second layer.

7. The oscillating heat engine of claim 6 wherein said first portion of said oscillating member is the first layer.

8. The oscillating heat engine of claim 1 wherein said oscillating member is a variable capacitor.

9. The oscillating heat engine of claim 1 wherein said oscillating member has a second portion;
   wherein said second portion has a magnetic permeability greater than air.

10. The oscillating heat engine of claim 1 wherein said second portion contains iron.

11. The oscillating heat engine of claim 8 wherein said variable capacitor is part of a variable capacitive electrostatic generator.

12. The oscillating heat engine of claim 9 wherein said second member is part of an inductive electrical generator.

13. A method of producing self assembled devices comprising;
   depositing a first layer on a substrate;
   depositing a second layer thus forming a shape;
   wherein said first and second layers have different thermal expansion coefficients;
   changing temperature of the layers by at least 10 degrees centigrade;
   wherein said changing of the temperature changes the shape,
   wherein said shape has a dimension less than 100 microns,
   wherein said self assembled device is a heat engine by adding,
   a heat source and
   a cold source,
   wherein said heat engine has a temperature gradient between said heat source and said cold source,
   wherein said temperature gradient is the difference between said heat source and said cold source,
   wherein said temperature gradient has a heat flow,
   wherein a portion of said heat flow is converted into mechanical power,
   wherein said mechanical power portion is a fraction of said heat flow,
   wherein said mechanical power fraction is proportional to said difference between said heat source and said cold source,
   wherein said heat engine contains an isolation region,
   wherein said isolation region reduces said heat flow into said cold source,
   wherein an oscillating member has at least a first and a second position,
   wherein said heat source has a distance from said oscillating member,
   wherein said distance from said oscillating member oscillates when said oscillating member oscillates
   wherein said heat source has a heat source temperature above the austenite transformation temperature, wherein said cold source has a cold source temperature below the martensite transformation temperature, wherein said heat source temperature is capable of transforming the phase of a portion of the shape memory alloy of the oscillating member when in said first position from martensite to austenite thus changing the oscillating member position from said first position to said second position, wherein said cold source temperature is capable of transforming the phase of a portion of the shape memory alloy of the oscillating member when in said second position from austenite to martensite thus changing the oscillating member position from said second position to said first position, wherein said cold source transforming the phase occurs when said heat source is at said heat source temperature, said heat engine having means for converting mechanical energy into electrical energy.

14. The method as claimed in claim 13;

wherein said shape change causes contact with and moves a second device, wherein said second device is a micromirror.

15. The oscillating heat engine of claim 1 wherein said oscillating member has at least a first and a second position, wherein said oscillating member has a first temperature, wherein when said oscillating member at said first position has said first temperature, wherein when said oscillating member at said second position has said first temperature, wherein said heat source has a heat source temperature large enough to change the position of the oscillating member from the first position to the second position, wherein said cold source has a cold source temperature low enough to change the position of the oscillating member from the second position to the first position.

16. The oscillating heat engine of claim 1 wherein said oscillating member has at least a first and a second temperature, wherein said oscillating member has at least a first position, wherein said oscillating member has said first temperature at said first position, wherein said oscillating member has said second temperature at said first position, wherein said heat source has a heat source temperature at or above said first temperature, wherein said cold source has a cold source temperature at or below said second temperature, wherein said oscillating member transfers heat between said heat source and said cold source.

* * * * *